(12) United States Patent
Hsu et al.

(10) Patent No.: US 7,988,831 B2
(45) Date of Patent: Aug. 2, 2011

(54) METHOD FOR PURIFYING AN AQUEOUS PATASSIUM HYDROXIDE SOLUTION HAVING RICH SILICON IMPURITIES

(75) Inventors: Yung Hsiung Hsu, Taipei (TW); Sage Hsu, Taipei (TW)

(73) Assignee: Yeou Fa Chemical Co., Ltd., Taipei (TW)

( * ) Notice: Subject to any disclaimer, the term of this patent is extended or adjusted under 35 U.S.C. 154(b) by 454 days.

(21) Appl. No.: 12/314,951

(22) Filed: Dec. 19, 2008

(65) Prior Publication Data
US 2010/0032281 A1 Feb. 11, 2010

(30) Foreign Application Priority Data
Aug. 7, 2008 (TW) .............................. 97130152 A

(51) Int. Cl.
B01D 11/04 (2006.01)
C01D 1/34 (2006.01)
C01D 3/18 (2006.01)
C07C 29/86 (2006.01)

(52) U.S. Cl. ............. 203/18; 159/47.3; 203/19; 203/43; 203/63; 210/634; 423/594.15; 423/641

(58) Field of Classification Search .................. 159/47.3, 159/DIG. 20; 203/1, 2, 18, 19, 38, 43, 63; 210/634; 423/594.15, 641, 646
See application file for complete search history.

(56) References Cited

U.S. PATENT DOCUMENTS

| | | | | |
|---|---|---|---|---|
| 3,720,626 A | * | 3/1973 | Benzaria et al. | 502/25 |
| 5,766,565 A | * | 6/1998 | Cronin et al. | 423/488 |
| 6,747,065 B1 | * | 6/2004 | Paszkowski | 516/83 |

* cited by examiner

Primary Examiner — Virginia Manoharan
(74) Attorney, Agent, or Firm — Bacon & Thomas, PLLC

(57) ABSTRACT

A method for purifying an aqueous potassium hydroxide solution having rich silicon impurities has been disclosed in the invention, which is particularly related to a method that utilizes a low-carbon alcohol (such as ethanol) for extracting said aqueous potassium hydroxide solution, and includes the steps of mixing a low-carbon alcohol with an aqueous potassium hydroxide solution having rich silicon impurities; allowing the resulting mixture therefrom to divide into an aqueous phase layer and a low-carbon alcohol phase layer that contains the aqueous potassium hydroxide solution with reduced silicon impurities, and subjecting the low-carbon alcohol phase layer to a separation process for removing the low-carbon alcohol, thereby resulting in an aqueous potassium hydroxide solution having reduced silicon impurities.

9 Claims, No Drawings

METHOD FOR PURIFYING AN AQUEOUS PATASSIUM HYDROXIDE SOLUTION HAVING RICH SILICON IMPURITIES

FIELD OF THE INVENTION

The present invention relates to a method for purifying an aqueous potassium hydroxide solution having rich silicon impurities, and more particularly to a method that utilizes a low-carbon alcohol for extracting said aqueous potassium hydroxide solution, and allows an aqueous phase layer and a low-carbon alcohol phase layer that contains the aqueous potassium hydroxide solution with reduced silicon impurities to form.

DESCRIPTION OF PRIOR ART

Nowadays, the chemical mechanical polishing (CMP) process has become vital to the semiconductor industry because of its extensive application in the manufacturing process of silicon wafers. A critical component in the CMP process is the potassium hydroxide solution used for facilitating the overall process, which could result in reduced efficiency of chemical polishing when the concentration of silicon impurities thereof increases from continuous accumulation. Therefore, the potassium hydroxide solution has to be replaced when the silicon impurities thereof accumulates to a certain concentration. However, when the consumption of the potassium hydroxide solution is put into perspective, the potassium hydroxide solution that has been consumed due to actual applications only occupies a small proportion of the overall potassium hydroxide solution, while a major proportion of the potassium hydroxide solution is discarded as wastes simply because the concentration of silicon impurities has become excessively high that it reduces the efficiency of the CMP process. The wastes resulted from the CMP process take up a fairly high proportion in the overall wastes released from a semiconductor factory, and is difficult to process. As a result, it is plausible to suggest that costs and resources can be saved significantly by removing the silicon impurities from the potassium hydroxide solution that would be otherwise treated as wastes from the CMP process, which consequently purifies the potassium hydroxide solution to allow for further uses.

However, few studies about the purification of potassium hydroxide wastes are available at the moment, and the lack of efficient and cost-effective methods for the aforesaid goal remains the biggest challenge so far. For example, in U.S. Pat. No. 6,747,065 B1; methods of ion exchange, ultrafiltration, and electrodialysis are used to obtain a purified potassium hydroxide solution. But the methods are complicated and require high costs to carry out.

After continuous researching, the inventors of the present invention has discovered that an aqueous potassium hydroxide solution having rich silicon impurities may be divided into layers and purified by using a low-carbon alcohol (especially ethanol). This discovery contradicts with the widely known phenomenon that ethanol and water can be dissolved into each other at any proportions without dividing into layers. After repeated experimentation, a simple and cost-effective manufacturing process using the aforesaid discovery has been developed for actual industrial applications.

SUMMARY OF THE INVENTION

A primary objective of the invention is to provide a method for purifying an aqueous potassium hydroxide solution having rich silicon impurities.

Another objective of the invention is to provide a method for extracting potassium hydroxide from an aqueous potassium hydroxide solution having rich silicon impurities by using a low-carbon alcohol.

A further objective of the invention is to provide a method for reducing a concentration of silicon impurities in an aqueous potassium hydroxide solution having rich silicon impurities by using a low-carbon alcohol.

The invention discloses a method for purifying an aqueous potassium hydroxide solution having rich silicon impurities, comprising the following steps:

mixing a low-carbon alcohol as an extractant with an aqueous potassium hydroxide solution having rich silicon impurities so as to extract said aqueous potassium hydroxide solution, subsequently allowing the resulting mixture to form an aqueous phase layer as a lower layer, and a low-carbon alcohol phase layer containing the aqueous potassium hydroxide solution having reduced silicon impurities as an upper layer;

recovering the low-carbon alcohol phase layer; and removing the low-carbon alcohol from said upper low-carbon alcohol phase layer, so as to obtain a purified aqueous potassium hydroxide solution.

In the aforesaid method for purifying an aqueous potassium hydroxide solution having rich silicon impurities, the methods used for removing the low-carbon alcohol may be any of the previously known techniques used to remove a low-carbon alcohol from a solution made up of the low-carbon alcohol and water; including: evaporation, distillation, adsorption, reverse osmosis using a membrane, liquid extraction, supercritical fluid extraction, and perstraction. The examples of the above-mentioned methods have been described in Taiwan Patent No. TW-057382. Among them the preferred methods are evaporation and distillation.

The aforesaid low-carbon alcohol refers to a carbon alcohol having a carbon number from two to four or a mixture thereof; such as ethanol, n-propanol, isopropanol, n-butanol, or a mixture thereof. In addition, the low-carbon alcohol is more preferably ethanol, a mixture made of ethanol and n-propanol, or a mixture made of ethanol and isopropanol, and is most preferably ethanol.

Moreover, a V/Wt ratio (volume-weight ratio of ml to g) between the aforesaid ethanol and the aqueous potassium hydroxide solution having rich silicon impurities should not be lower than 0.5, or no lower than 1.0, or even lower than 2.0.

In the aforesaid method for purifying an aqueous potassium hydroxide solution having rich silicon impurities, pure ethanol or an aqueous ethanol solution may be use, wherein the lower the weight percentage of ethanol in the aqueous ethanol solution used in the purification process, the worse the efficiency of extraction. Generally, the concentration of ethanol is preferably not lower than 50 wt %; is more preferably between 70 wt %-95 wt %, and is most preferably 95 wt %.

DETAILED DESCRIPTION OF PREFERRED EMBODIMENTS

The aforesaid objectives of the present invention will be more clearly understood when considered in conjunction with the accompanying embodiments.

EXAMPLES 1-7

Respectively, 19.9 g (Example 1), 29.4 g (Example 2), 35.4 g (Example 3), 39.6 g (Example 4), 60.4 g (Example 5), 79.2 g (Example 6), or 100 g (Example 7) of 95 wt % ethanol aqueous solution were added into 50 g of an aqueous potassium hydroxide solution having rich silicon impurities and mixed thoroughly. In other words, a V/Wt (ml/g) ratio between the ethanol and the aqueous potassium hydroxide solution having rich silicon impurities is 0.5, 0.75, 0.9, 1.0, 1.5, 2.0, and 2.5, respectively; as shown in Table 1. The aforesaid aqueous potassium hydroxide solution has a concentration of silicon impurities of 2040 ppm, as well as a concentration of potassium hydroxide of 52.24 wt %. After thoroughly mixing the ethanol solution and the aqueous potassium hydroxide solution having rich silicon impurities together, the resulting mixture was left at room temperature without stirring, so that an upper layer and a lower layer were formed. The upper layer is an ethanol phase layer that includes the aqueous potassium hydroxide solution having reduced silicon impurities, while the lower layer is an aqueous phase layer. Subsequently, the upper ethanol phase layer was recovered from the layered mixture, and ethanol was removed therefrom by distillation to obtain an aqueous potassium hydroxide solution having reduced silicon impurities. The concentrations of potassium hydroxide and silicon impurities in the potassium hydroxide solution after the removal of ethanol are respectively listed in Table 1 below.

EXAMPLES 8-13

Respectively, 20.4 g (Example 8), 30.0 g (Example 9), 40.2 g (Example 10), 60.6 g (Example 11), 79.8 g (Example 12), 84.8 g (Example 13) of 95 wt % ethanol aqueous solution were added into 50 g of an aqueous potassium hydroxide solution having rich silicon impurities and mixed thoroughly. In other words, a V/Wt (ml/g) ratio between the ethanol and the aqueous potassium hydroxide solution having rich silicon impurities is 0.5, 0.75, 1.0, 1.5, 2.0, and 2.5, respectively; as shown in Table 2. The aforesaid aqueous potassium hydroxide solution has a concentration of silicon impurities of 1.85 wt %, as well as a concentration of potassium hydroxide of 39 wt %. After thoroughly mixing together the ethanol solution and the aqueous potassium hydroxide solution having rich silicon impurities, the resulting mixture was left at room temperature without stirring, so that an upper layer and a lower layer were formed. The upper layer is an ethanol phase layer that includes the aqueous potassium hydroxide solution having reduced silicon impurities, while the lower layer is an aqueous phase layer. Subsequently, the upper ethanol phase layer was recovered from the layered mixture, and ethanol was removed therefrom by distillation to obtain an aqueous potassium hydroxide solution having reduced silicon impurities. The concentrations of potassium hydroxide and silicon impurities in the potassium hydroxide solution after the removal of ethanol are respectively listed in Table 2 below.

TABLE 1

An aqueous potassium hydroxide solution of 50 g, 52.24 wt %, and has a silicon concentration of 2040 ppm, has the listed silicon concentration after purification by using an ethanol solution.

| Ex. | Ethanol/KOH solution (V/Wt) | Ethanol extracting solution (g) | The upper layer (after removing ethanol) | | | Aqueous KOH solution having a concentration adjusted to 45 wt % | | |
|---|---|---|---|---|---|---|---|---|
| | | | Weight (g) | KOH conc. (wt %) | Si conc. (ppm) | Weight (g) | KOH conc. (wt %) | Si conc. (ppm) |
| 1 | 0.5 | 19.9 | 11.7 | 70.0 | 297 | 18.2 | 45 | 191 |
| 2 | 0.75 | 29.4 | 20.8 | 58.3 | 357 | 26.6 | 45 | 276 |
| 3 | 0.9 | 35.4 | 23.4 | 60.7 | 379 | 31.6 | 45 | 281 |
| 4 | 1.0 | 39.6 | 25.0 | 64.0 | 535 | 35.6 | 45 | 376 |
| 5 | 1.5 | 60.4 | 37.2 | 55.4 | 701 | 45.8 | 45 | 569 |
| 6 | 2.0 | 79.2 | 44.2 | 54.8 | 879 | 53.8 | 45 | 723 |
| 7 | 2.5 | 100.0 | 46.6 | 54.2 | 890 | 56.1 | 45 | 739 |

The results from Examples 1-7 indicate that after purification, the concentration of silicon impurities in the aqueous potassium hydroxide solution is reduced significantly. Moreover, the volume of purified aqueous potassium hydroxide solution increases as the volume of ethanol extracting solution increases.

TABLE 2

An aqueous potassium hydroxide solution of 50 g, 39 wt %, and has a silicon concentration of 1.85 wt %, has the listed silicon concentration after purification by using an ethanol solution.

| Ex. | Ethanol/KOH solution (V/Wt) | Ethanol extracting solution (g) | The upper layer (after removing ethanol) | | | Aqueous KOH solution having a concentration adjusted to 45 wt % | | |
|---|---|---|---|---|---|---|---|---|
| | | | Weight (g) | KOH conc. (wt %) | Si conc. (ppm) | Weight (g) | KOH conc. (wt %) | Si conc. (ppm) |
| 8 | 0.5 | 20.4 | 12 | 38.3 | 3020 | 10.2 | 45 | 3553 |
| 9 | 0.75 | 30.0 | 16.8 | 35.9 | 3184 | 13.4 | 45 | 3992 |
| 10 | 1.0 | 40.2 | 21.8 | 35.2 | 2234 | 17.1 | 45 | 2848 |
| 11 | 1.5 | 60.6 | 29.2 | 32.5 | 2269 | 21.1 | 45 | 3140 |
| 12 | 2.0 | 79.8 | 33.4 | 29.5 | 2016 | 21.9 | 45 | 3075 |
| 13 | 2.5 | 84.8 | 35 | 25.0 | 1734 | 19.4 | 45 | 3128 |

The outcome for Examples 8-13 shows that the concentration of silicon impurities in the aqueous potassium hydroxide solution is lowered significantly after being purified by using ethanol. As the volume of ethanol used for extraction is raised, the volume of purified aqueous potassium hydroxide solution is elevated as well. Furthermore, the V/Wt ratio between the ethanol and the aqueous potassium hydroxide solution is preferably no less than 0.5, wherein the V/Wt ratio between the ethanol and the aqueous potassium hydroxide solution is more preferably no less than 1.0.

In addition, if the V/Wt ratio between the ethanol and the aqueous potassium hydroxide solution is lowered to between 0.3 and 0.5, the efficiency of extraction would be reduced. The less the V/W ratio is, the worse the efficiency of extraction.

Moreover, if the ethanol aqueous solution being mixed into the aqueous potassium hydroxide solution having rich silicon impurities has a weight percentage less than 50 wt %, the aqueous potassium hydroxide solution cannot be divided into two different layers effectively, which prevents the extraction of purified aqueous potassium hydroxide solution from occurring successfully. Therefore, the concentration of the ethanol aqueous solution used for extraction is preferably no less than 50 wt %.

EXAMPLES 14-17

Respectively, 78 g of a mixed solution of 95 wt % ethanol and 5 wt % isopropanol (IPA, Example 14), or 78 g of a mixed solution of 90 wt % ethanol and 10 wt % isopropanol (Example 15), or 78 g of a mixed solution of 85 wt % ethanol and 15 wt % isopropanol (Example 16), or 78 g of a mixed solution of 80 wt % ethanol and 20 wt % isopropanol (Example 17), as an extracting solution of low-carbon alcohols, were added into 50 g of an aqueous potassium hydroxide solution having rich silicon impurities and mixed thoroughly. The aforesaid aqueous potassium hydroxide solution has a concentration of silicon impurities of 1.85 wt %, as well as a concentration of potassium hydroxide of 39 wt %. After thoroughly mixing the extracting solution with the aqueous potassium hydroxide solution having rich silicon impurities, the resulting mixture was left at room temperature without stirring, so that an upper layer and a lower layer were formed. The upper layer is a low-carbon alcohol phase layer that includes the aqueous potassium hydroxide solution having reduced silicon impurities, while the lower layer is an aqueous phase layer. The upper layer was recovered from the layer mixture, and the low-carbon alcohols were removed therefrom by distillation to obtain an aqueous potassium hydroxide solution having reduced silicon impurities. The concentrations of potassium hydroxide and silicon impurities in the potassium hydroxide solution after the removal of the low-carbon alcohols are respectively listed in Table 3 below.

TABLE 3

An aqueous potassium hydroxide solution of 50 g, 39 wt %, and has a silicon concentration of 1.85 wt %, has the listed silicon concentration after purification by using a mixed solvent made of ethanol and isopropanol.

| Ex. | Extracting solution 78 g | The upper layer (after removing the alcohols) | | | Aqueous KOH solution having a concentration adjusted to 45 wt % | | |
|---|---|---|---|---|---|---|---|
| | | Weight (g) | KOH conc. (wt %) | Si conc. (ppm) | Weight (g) | KOH conc. (wt %) | Si conc. (ppm) |
| 14 | 95 wt % ethanol + 5 wt % IPA | 31.4 | 44.2 | 1638 | 30.8 | 45 | 1609 |
| 15 | 90 wt % ethanol + 10 wt % IPA | 26.8 | 47.7 | 1822 | 28.4 | 45 | 1931 |
| 16 | 85 wt % ethanol + 15 wt % IPA | 26.6 | 48.8 | 1738 | 28.8 | 45 | 1884 |
| 17 | 80 wt % ethanol + 20 wt % IPA | 26.2 | 48.5 | 1690 | 28.2 | 45 | 1821 |

The results of Examples 14-17 show that the concentration of silicon impurities in the aqueous potassium hydroxide solution is lowered significantly after being purified by using a mixed solution of ethanol and isopropanol.

EXAMPLES 18-21

Respectively, add 100 g of 95 wt % ethanol with 5 wt % n-propanol (Example 18), or 90 wt % ethanol with 10 wt % n-propanol (Example 19), or 85 wt % ethanol with 15 wt % n-propanol (Example 20), or 80 wt % ethanol with 20 wt % n-propanol (Example 21), as an extracting solution of low-carbon alcohols, were added into 50 g of an aqueous potassium hydroxide solution having rich silicon impurities and mixed thoroughly. The aforesaid aqueous potassium hydroxide solution has a concentration of silicon impurities of 1.85 wt %, as well as a concentration of potassium hydroxide of 39 wt %. After thoroughly mixing the extracting solution with the aqueous potassium hydroxide solution having rich silicon impurities, the resulting mixture was left at room temperature without stirring, so that an upper layer and a lower layer were formed. The upper layer is a low-carbon alcohol phase layer that includes the aqueous potassium hydroxide solution having reduced silicon impurities, whereas the lower layer is an aqueous phase layer. The upper layer was recovered from the layered mixture, and the alcohols were removed therefrom by distillation to obtain an aqueous potassium hydroxide solution having reduced silicon impurities. The concentrations of potassium hydroxide and silicon impurities in the potassium hydroxide solution after the removal of alcohols are respectively listed in Table 4 below.

TABLE 4

An aqueous potassium hydroxide solution of 50 g, 39 wt %, and has a
silicon concentration of 1.85 wt %, has the listed silicon concentration after
purification by using a mixed solvent made of ethanol and n-propanol.

| Ex. | Extracting solution 100 g | The upper layer (after removing the alcohols) | | | Aqueous KOH solution having a concentration adjusted to 45 wt % | | |
|---|---|---|---|---|---|---|---|
| | | Weight (g) | KOH conc. (wt %) | Si conc. (ppm) | Weight (g) | KOH conc. (wt %) | Si conc. (ppm) |
| 18 | 95 wt % ethanol + 5 wt % n-propanol | 34.2 | 46.7 | 3053 | 35.5 | 45 | 2941 |
| 19 | 90 wt % ethanol + 10 wt % n-propanol | 32.6 | 45.1 | 2758 | 32.7 | 45 | 2750 |
| 20 | 85 wt % ethanol + 15 wt % n-propanol | 31.6 | 44.6 | 2345 | 31.3 | 45 | 2367 |
| 21 | 80 wt % ethanol + 20 wt % n-propanol | 30.8 | 45.4 | 2060 | 31.1 | 45 | 2040 |

The outcome from Examples 18-21 indicates that in comparison with the untreated aqueous potassium hydroxide solution, the aqueous potassium hydroxide solution purified by using a mixed solution of ethanol and n-propanol has a significantly lower concentration of silicon impurities. In addition, the concentration of purified potassium hydroxide increases slightly when the proportion of ethanol is raised.

Although particular embodiments of the invention have been described in details for purposes of illustration, it will be understood by one of ordinary skill in the art that numerous variations will be possible to the disclosed embodiments without going beyond the scope of the invention as disclosed in the claims.

What is claimed is:

1. A method for purifying an aqueous potassium hydroxide solution having rich silicon impurities, comprising the following steps:
   mixing a low-carbon alcohol as an extractant with an aqueous potassium hydroxide solution having rich silicon impurities so as to extract said aqueous potassium hydroxide solution, subsequently allowing the resulting mixture to form a lower aqueous phase layer, and an upper low-carbon alcohol phase layer containing an aqueous potassium hydroxide solution having reduced silicon impurities;
   recovering the upper low-carbon alcohol phase layer; and
   removing the low-carbon alcohol from said low-carbon alcohol phase layer, so as to obtain a purified aqueous potassium hydroxide solution.

2. The method of claim 1, wherein said step of removing the low-carbon alcohol is carried out by using evaporation or distillation.

3. The method of claim 1, wherein said low-carbon alcohol is ethanol, n-propanol, isopropanol, n-butanol, or a mixture thereof.

4. The method of claim 3, wherein said low-carbon alcohol is ethanol.

5. The method of claim 4, wherein a concentration of said ethanol is no less than 50 wt %.

6. The method of claim 5, wherein a concentration of said ethanol is between 70 wt % and 95 wt %.

7. The method of claim 4, wherein a volume (ml)/weight (g) ratio of said ethanol to said aqueous potassium hydroxide solution having rich silicon impurities is no less than 0.5.

8. The method of claim 7, wherein a volume (ml)/weight (g) ratio of said ethanol to said aqueous potassium hydroxide solution having rich silicon impurities is no less than 1.0.

9. The method of claim 8, wherein a volume (ml)/weight (g) ratio of said ethanol to said aqueous potassium hydroxide solution having rich silicon impurities is no less than 2.0.

* * * * *